United States Patent [19]
Pires

[11] Patent Number: 5,671,278
[45] Date of Patent: Sep. 23, 1997

[54] VIDEO SCRAMBLING WITH VARIABLE FUNCTION GENERATOR

[76] Inventor: H. George Pires, 47H Valley Rd., Hampton, N.J. 08827

[21] Appl. No.: 444,850

[22] Filed: May 19, 1995

[51] Int. Cl.$^6$ .................................................. H04N 7/167
[52] U.S. Cl. ..................... 380/7; 380/15; 380/20
[58] Field of Search ........................ 380/7, 15, 20

[56] References Cited

U.S. PATENT DOCUMENTS

| | | | |
|---|---|---|---|
| 3,081,376 | 3/1963 | Loughlin et al. | 380/15 |
| 3,729,576 | 4/1973 | Court . | |
| 4,145,716 | 3/1979 | Vemura et al. | 380/7 |
| 4,313,133 | 1/1982 | Fukushima | 380/7 |
| 4,424,532 | 1/1984 | Toonder et al. | 380/7 |
| 4,454,543 | 6/1984 | Lund et al. | 380/7 |
| 5,142,574 | 8/1992 | West, Jr. et al. | 380/7 |

*Primary Examiner*—Stephen C. Buczinski
*Attorney, Agent, or Firm*—Rohm & Monsanto

[57] ABSTRACT

A video scrambling and descrambling arrangement utilizes plural scrambling characteristics including a predetermined scrambling waveform and a selectable one of a plurality of phase relationships with respect to the video signal to be scrambled. Descrambling is achieved by combining with the scrambled video signal a correspondingly phase shifted, inverted version of the scrambling signal. Scrambling and descrambling can be implemented in analogue or digital forms. The information required to achieve descrambling is contained in the scrambled video signal, preferably in an unscrambled portion thereof.

32 Claims, 5 Drawing Sheets

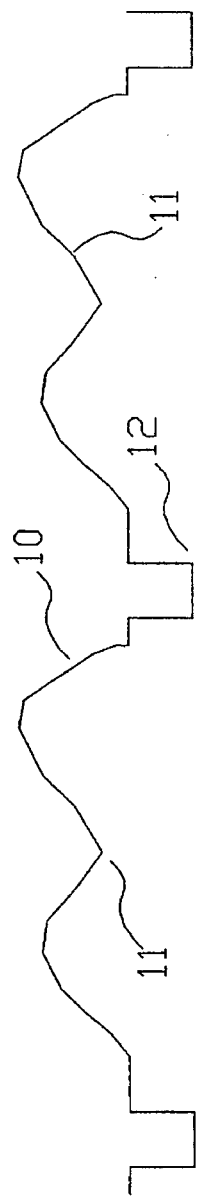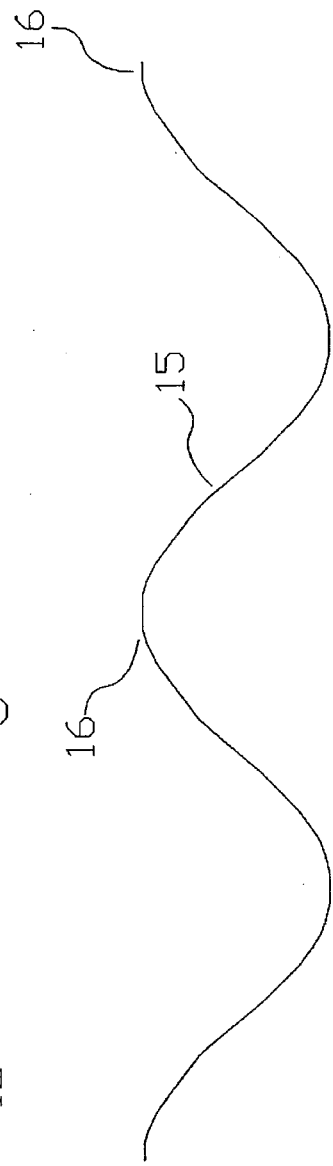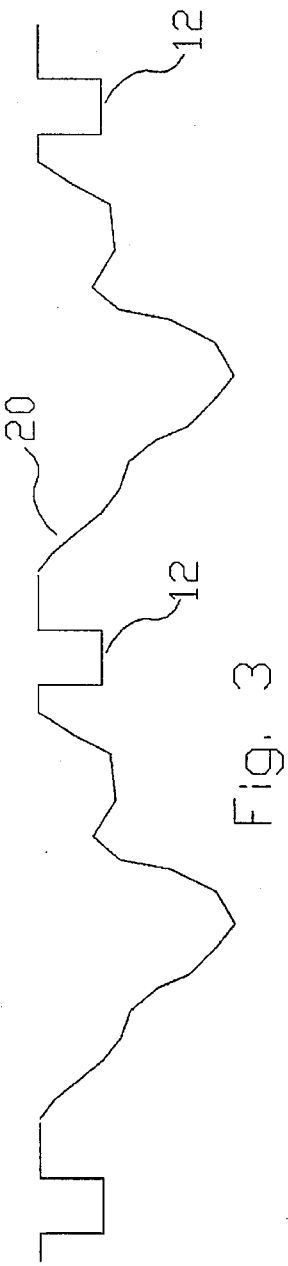

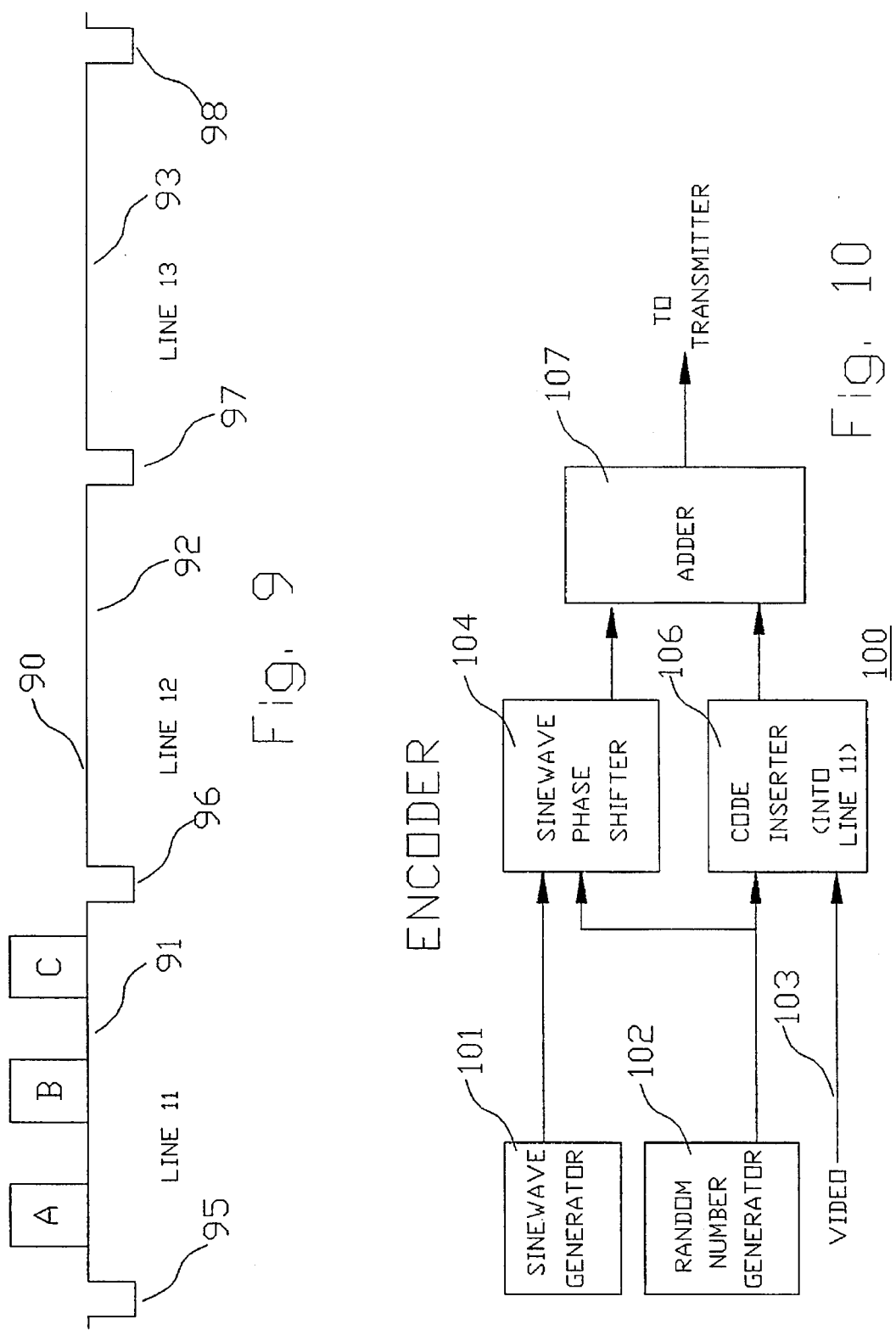

VIDEO SCRAMBLING WITH VARIABLE FUNCTION GENERATOR

BACKGROUND OF THE INVENTION

1. Field of the Invention

This invention relates generally to signal encryption and decoder systems, and more particularly, to system for scrambling and descrambling video signals wherein the decoding information is carried directly with the channel of interest, the system being very difficult to defeat by individual and large scale pirates.

2. Description of the Related Art

There is a need for a video encryption system which transmits a scrambling code from a sending unit to a number of decoders at respective receiving stations, wherein the system is inexpensive and affords a high degree of security. In the field of video transmission, in particular, there is a need for a coding system which achieves the aforementioned advantages, and which is compatible with a wide variety of scrambling systems. Such adaptability of the coding scheme would address directly the issue of maintaining costs low.

It is, of course, the primary purpose of a video scrambling scheme to prevent the information content of the video signal from becoming available to unauthorized receivers. Although it is important to achieve a high measure of security against unauthorized reception by individuals, such as individual cable television service subscribers, the far greater problem is that of pirates who operate on a large scale. In this regard, it is important to recognize that absolute system security, although a worthwhile goal, is not the end to be achieved. Any coding system, no matter how secure, can eventually be defeated. However, the business of pirating video services is, like any other business, subject to certain economic principles. The large scale pirate must always be mindful of the costs associated with overcoming a video encryption system. There is, therefore, a need for a video scrambling and descrambling system which is prohibitively expensive for the pirate to overcome on a large scale.

In addition to the foregoing, it is desirable that the cost of video scrambling and descrambling systems be reduced, such as by permitting decoders to be available to, and owned by, customers or subscribers. Such decoders should be of a type which can be enabled only by the station operator, who also should have the ability to disable any decoder at anytime.

One of the problems with present scrambling systems is that the decoding function is not active, in that the keys required to effect decoding do not change rapidly. In some such systems, a simple short circuit or jumper connection will permanently enable the decoder. There is a need for a decoder arrangement which is immune from any one-time modification which would enable same permanently. In addition, there is a need for a decoder system which avoids the possibility that a bank of switches on a pirate decoder could be set for a particular configuration which would last for a viewing period.

One method of scrambling video which has been widely used consists of adding a sine wave signal to the video signal. The frequency of the sine wave signal is the same as the horizontal line rate, and the phase is set such that the positive-going peak corresponds to the position of the sync pulse. This raises the level of the sync pulse tip to more positive levels than the other parts of the horizontal line. The scrambled signal therefore cannot be viewed on standard receivers, because their sync separators trigger on the most negative portions of the video signal, irrespective of whether the most negative portion is the sync pulse tip. In this manner, the video signal is scrambled.

This known arrangement unscrambles the video by inserting a signal of equal and opposite phase at the receiving station, to cancel out the sine wave signal used for scrambling. The known system generally interrupts the scrambling sine wave signal during the vertical interval. This interruption, however, is not essential to the scrambling process, but facilitates the generation of the unscrambling sine wave signal at the decoders.

It is a significant disadvantage of this known method of scrambling that it is relatively easy to defeat. It is relatively easy to make unauthorized decoder boxes which can produce a sine wave signal capable of unscrambling the video signal, particularly since the frequency, phase and amplitude are all constant and easily generated.

It is another shortcoming of currently available video security systems that a second system, such as a telephone link or a card is required to effect descrambling. In such systems, two keys are sent over different links of communication, one over the air and the other via a telephone link.

It is, therefore, an object of this invention to provide a system which encrypts and decodes a multicomponent signal of interest, such as a video signal, with a high degree of security.

It is another object of this invention to provide a video encoding and decoding system wherein pirating of services on a large scale is prohibitively expensive.

It is also an object of this invention to provide a signal encoding system wherein the information required to achieve decoding is carried, at least in part, in the encoded signal of interest.

It is yet a further object of this invention to provide a scrambled video transmission system wherein the decoding process is active, requiring rapidly periodic decoding processes to be performed on the video signal.

It is also another object of this invention to provide a video scrambling system where no additional communications links are required to transmit decoding information or keys.

It is still another object of this invention to provide a scrambled video transmission system wherein security codes are changeable throughout the system without requiring interruption of the service.

An additional object of this invention is to provide a descrambling system which cannot be overcome merely by placing an enabling jumper wire in the circuit.

Yet another object of this invention is to provide a descrambling system which employs decoders at each receiving station, wherein the decoders cannot be unauthorizedly enabled even for the duration of a viewing period.

Another object of this invention is to provide a signal scrambling and descrambling system which employs multiple decoder characteristics but does not rely on a channel of communication other than the signal channel itself to transmit descrambling information to the decoder at the receiving station.

SUMMARY OF THE INVENTION

The foregoing and other objects are achieved by this invention which provides, in a system aspect thereof, an arrangement for supplying video information contained in a video signal from a sending station exclusively to a receiving station which is authorized to receive the video information. In accordance with the invention, there is provided a scrambling system which is coupled at an input thereof to the sending station for receiving the video signal. The scrambling system distorts at least a portion of the video signal to produce a distorted video signal which is distorted in accordance with a selected one of a plurality of distortion modes. Each distortion mode corresponds to a respective one of a plurality of predetermined angular phase variations of a predetermined video distortion characteristic so as to produce a corresponding distortion in the distorted video signal. A security code encoder is coupled to the scrambling system for encoding in a portion of the video signal security data which identifies the selected one of the plurality of distortion modes being applied to the video signal to produce the distorted video signal. At the receiving station, there is provided a security code/decoder for decoding the video signal security data. Additionally, there is provided at the receiving station a descrambling system for receiving the distorted video signal, and which is coupled to the security code decoder. The descrambling system restores the video signal in response to the video signal security data received from the security code/decoder. In this manner, the selected one of the plurality of distortion modes is reversed to produce a corresponding correction in the distorted video signal.

In accordance with a specific illustrative embodiment of the invention, the descrambling system is provided with a descrambling combiner for combining an inverted predetermined angular phase variation of the predetermined video distortion characteristic with the distorted video signal. The descrambling combiner includes, in some embodiments, an adder for producing an output video signal which corresponds to the sum of the distorted video signal and the inverted predetermined angular phase variation of the predetermined video distortion characteristic.

In a further embodiment of this system aspect of the invention, the scrambling system is provided with a scrambling signal generator for generating the predetermined video distortion characteristic in the form of a distortion characteristic signal. In this specific embodiment, the descrambling system is provided with a descrambling signal generator for generating an inverted form of the predetermined video distortion characteristic, in the form of a distortion characteristic correction signal. The distortion characteristic signal is a substantially periodic signal in some embodiments of the invention. Additionally, the distortion characteristic correction signal is an inverted form of the substantially periodic signal.

As indicated, the distortion characteristic signal may be periodic. In some embodiments, the frequency of the distortion characteristic signal is equal to the horizontal line frequency. However, it is to be understood that the system of the present invention is not limited to such a frequency relationship between the distortion characteristic signal and the horizontal line frequency, or the repetition rate of the line sync pulses. In some embodiments of the invention, the distortion characteristic signal may have a frequency which corresponds to a multiple or submultiple of the horizontal frequency. In some embodiments, the frequency relationship of the distortion characteristic signal to the horizontal frequency may be as simple as twice or one-half. In other embodiments, the relationship may be a non-integer ratio, such as 9 cycles of distortion characteristic signal to 11 cycles of the horizontal frequency, or vice versa. As will be described hereinbelow in detail, the high video scrambling security achieved in the practice of the present invention relates primarily to the random periodic changes in the phase of the distortion characteristic signal, and the communication of such phase changes to the receiving stations. Thus, only properly authorized decoders can be used to view a corrected video image.

In an illustrative embodiment of the invention, the scrambling system is coupled to a random generator which is applied to select one of the plurality of distortion modes which is applied, at a given time to the video signal. The random generator, therefore, ensures that the sequence of distortion modes applied to the transmitted video signal is not predeterminable. The security code which is encoded into the video signal as security data is responsive to the value issued by the random generator. In a preferred embodiment, the security encoder encodes the video signal with the security data in an undistorted portion of the video signal.

In accordance with a decoder aspect of the invention, a decoder system receives and descrambles a scrambled video signal. The decoder system is provided with a signal generator for generating a plurality of distortion mode correction signals, each of which corresponds to a respective one of a plurality of predetermined angular phase variations of a predetermined video distortion characteristic of the scrambled video signal. The signal generator therefore produces a corresponding correction to descramble the video signal. The system is provided with a code detector for providing a scrambled code which represents the respective one of the plurality of predetermined angular phase variations of the predetermined video distortion characteristic of the scrambled video signal. A signal combiner combines the scrambled video signal with a respective one of the distortion mode correction signals selected in response to the code detector.

In a specific embodiment of this decoder aspect of the invention, the code detector is arranged to extract from the scrambled video signal the scrambled code which represents the respective one of the plurality of predetermined angular phase variations of the predetermined video distortion characteristic of a scrambled video signal. Preferably, the code detector is arranged to extract the scrambled code from an unscrambled portion of a scrambled video signal.

In a further embodiment, the distortion mode correction signals each correspond to an inversion of an associated one of the plurality of predetermined angular phase variations of the predetermined video distortion characteristic of the scrambled video signal. Thus, a correction to the scrambled video signal can easily be achieved when the corresponding inversion is combined with the scrambled video signal in the signal combiner. As previously indicated, the signal combiner may be in the form of an adder arrangement.

In a specific illustrative embodiment of the invention, the signal generator is formed of a correction waveform generator which generates a video distortion correction characteristic signal which corresponds to an inversion of a predetermined video distortion characteristic of a scrambled video signal.

A plurality of phase-changing circuits, each coupled at an input thereof to the correction waveform generator, are provided, each having a respective phase-change characteristic. Each of the phase-changing circuits has an output for producing a respective predetermined angular phase variation of the video distortion correction characteristic signal. In this highly specific illustrative embodiment, a plurality of gates, each having open and closed states, are coupled to a respectively associated one of the phase-changing circuits. A phase controller is coupled to each of the gates for controlling the open and closed states thereof in response to the code detector. Each of the gates is coupled to the signal combiner for achieving the correction to the scrambled video signal, as previously described.

In accordance with an encoder aspect of the invention, an encoder system receives a video signal and forms a scrambled video signal corresponding thereto. In accordance with the invention, a scrambling signal generator is provided for generating a plurality of distortion mode signals, each distortion mode signal corresponding to a respective one of a plurality of predetermined angular phase variations of a predetermined video distortion characteristic of the scrambled video signal. A code generator provides a scrambled code which identifies the respective one of the plurality of predetermined angular phase variations of the predetermined video distortion characteristic of the scrambled video signal. Additionally, a signal combiner combines the video signal with the respective one of the distortion mode signals identified by the code generator. The resulting combined signal corresponds to the scrambled video signal.

In one embodiment of the invention, there is provided a code inserter for inserting the scramble code into the scrambled video signal. Preferably, the scramble code is inserted into an unscrambled portion of the scrambled video signal.

In a specific illustrative embodiment of the invention, the scrambling signal generator is provided with a scrambling waveform generator which generates a video distortion characteristic signal which corresponds to the predetermined video distortion characteristic of the scrambled video signal. There is additionally provided a plurality of phase-changing circuits, each coupled at an input thereof to the scrambling waveform generator. Each such phase-changing circuit has a respective phase-changing characteristic, and each further has an output for producing a respective predetermined angular phase variation of the video distortion characteristic signal. The phase-changing circuits are each coupled to a respective one of a plurality of scrambling gates, each having open and closed states. A phase controller is coupled to each of the scrambling gates controlling the open and closed states thereof in response to the code generator. In a preferred embodiment, the cede generator includes a random number generator for selecting a random sequence of the respective phase-change characteristics which are applied to scramble the video signal.

In accordance with a method aspect of the invention, a scrambled video signal is unscrambled at a receiving station. The scrambled video signal is of the type having a plurality of potential scrambling modes. The unscrambling is achieved in accordance with the steps of:

detecting a scramble code which identifies a phase-related scramble mode of the scrambled video signal;

generating a plurality of possible phase-related correction signals, each having the capacity to correct for a respectively associated one of the plurality of potential scramble modes of the scrambled video signal;

selecting one of the plurality of possible phase-related correction signals in response to the scramble code; and combining the scrambled video signal with the selected one of the plurality of possible phase-related correction signals, whereby the scrambled video signal is unscrambled.

In accordance with a specific embodiment of this method aspect of the invention, the step of detecting is performed on an unscrambled portion of the scrambled video signal. In a further embodiment, the step of generating includes the further steps of:

generating a correction signal waveform corresponding to a primary distortion characteristic of the scrambled video signal; and producing a plurality of predetermined phase-shifted versions of the correction signal waveform.

The primary distortion characteristic of the scrambled video signal may be, in some embodiments of the invention, a substantially periodic waveform. As previously indicated, the frequency of the distortion characteristic signal is not limited to any predetermined frequency relationship between the distortion characteristic signal and the horizontal line frequency, or the repetition rate of the line sync pulses. Video scrambling security is achieved in the practice of the present invention primarily from the random periodic changes in the phase of the distortion characteristic signal, and the communication of such phase changes to the receiving stations.

In accordance with a further method aspect of the invention, there is provided a method of unscrambling a scrambled video signal received at a receiving station. The scrambled video signal has a plurality of potential scramble modes and further is of the type having a plurality of sequential horizontal intervals. The method includes the steps of:

determining a first scramble characteristic of the scrambled video signal, the first scramble characteristic corresponding to a predetermined time displacement relationship between the sequential horizontal intervals;

determining a second scramble characteristic of the scrambled video signal, the second scramble characteristic corresponding to a predetermined one of a plurality of timing phase relationships between the first scramble characteristic of the scrambled video signal and a predetermined one of the sequential horizontal intervals;

generating a correction signal for correcting for a distortion effect in the scrambled video signal, the correction signal having a first unscramble characteristic corresponding to an inversion of the first scramble characteristic, and a second unscramble characteristic corresponding to the predetermined one of the plurality of timing phase relationships; and combining the scrambled video signal with the correction signal, whereby the scrambled video signal is unscrambled.

In accordance with a specific embodiment of this further method aspect of the invention, the scramble characteristic corresponds substantially to a periodic function having any predetermined or selectable frequency relationship with respect to the horizontal frequency of the video signal. Of course, any other repetitive characteristic of the video signal can be used to form the frequency relationship between the video signal and the distortion characteristic signal. Thus, for example, the frequency of the distortion characteristic signal may be related to the repetition rate of the vertical interval. In other embodiments, the distortion characteristic signal may have a frequency characteristic which is not at all related to the video signal, but instead a periodically varying phase relationship therebetween is employed to achieve scrambling security. In addition, the periodic function can correspond substantially to a sinusoidal waveform function, a trapezoidal waveform, a sawtooth waveform, or any other predetermined or selectable waveform.

In a still further embodiment, the step of generating includes the further step of detecting a scramble code which identifies the predetermined one of a plurality of timing phase relationships between the first scramble characteristic of the scrambled video signal and the predetermined sequential horizontal interval.

As previously noted, the step of detecting is performed on the scrambled video signal, and preferably on an unscrambled portion of the scrambled video signal.

BRIEF DESCRIPTION OF THE DRAWING

Comprehension of the invention is facilitated by reading the following detailed description, in conjunction with the annexed drawing, in which:

FIG. 1 is a graphical representation of a standard video signal;

FIG. 2 is a graphical representation of a sinusoidal signal having the same frequency as the horizontal sync rate and phased so that the positive peak occurs during the sync interval;

FIG. 3 shows a scrambled video signal obtained by the addition of the signals of FIGS. 1 and 2;

FIG. 9 is a schematic graphical representation of a portion of a video signal which contains encoded data which is useful for unscrambling the video image;

FIG. 10 is a schematic, function block representation of a specific illustrative embodiment of an encoder system constructed in accordance with the principles of the invention.

DETAILED DESCRIPTION

Figure 4:
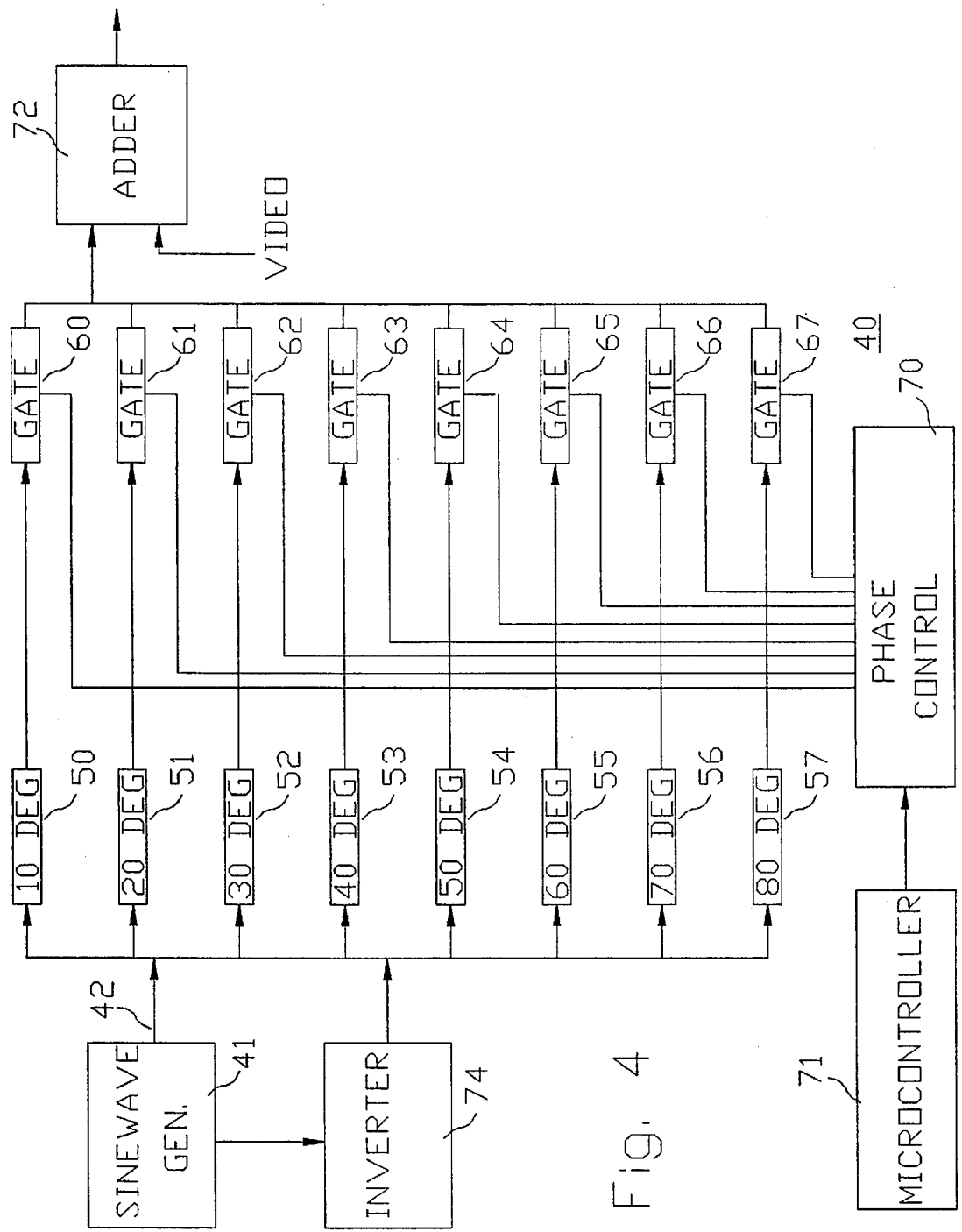
FIG. 4 is a functional block representation of a specific illustrative embodiment of the invention and which is useful to describe scrambling and unscrambling of a video signal.

FIG. 1 is a graphical representation of a standard video signal 10 having video information portions 11 interposed between standard negative-going sync pulses 12. Video signal 10 is depicted in this figure in a conventional manner, wherein a vertical axis (not shown) represents signal amplitude, and a horizontal axis (not shown) corresponds to time, time going forward toward the right-hand side of the figure. Sync pulses 12, therefore, are shown to extend negatively, and constitute the negative-most extent of the video signal.

FIG. 2 is a graphical representation of a scrambling signal 15 having a sinusoidal scrambling characteristic. The scrambling signal is shown in this figure on the same time scale as video signal 10 in FIG. 1. More specifically, scrambling signal 15 is shown to have a frequency which corresponds to the repetition rate of sync pulses 12, and is phased such that positive peaks 16 of the scrambling signal coincide in time with sync pulses 12. It is to be remembered, as previously noted, that the inventive system is not limited to any predetermined frequency relationship between the scrambling signal and the video signal.

FIG. 3 is a graphical representation of a scrambled video signal 20 which corresponds to the combination of video signal 10 added to scrambling signal 15. As shown in this figure, sync pulses 12 are elevated in voltage such that they do not constitute the negative-most extent of the scrambled video signal. Accordingly, a standard television receiver (not shown) will not trigger its line synchronization on such an elevated sync pulse.

Figure 5:
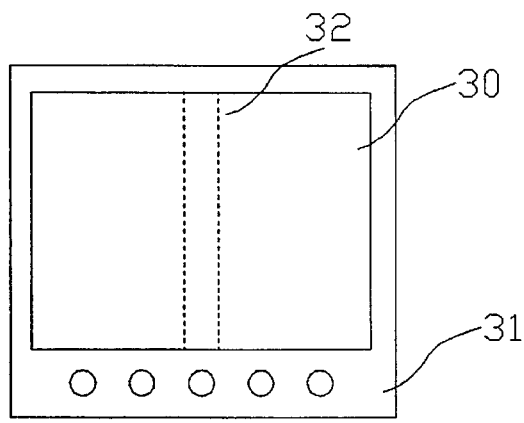
FIG. 5 is a simplified representation of the effect of a scrambled video signal on the image of a video monitor.

FIG. 5 is a simplified representation of a video image 30 shown on a video receiver 31. Video image 30 represents substantially the image which will be presented by scrambled video signal 20 in FIG. 3. Vertical bar 32 represents sync pulse 12, and is shown to be substantially in the middle of video image 30.

Figure 6:
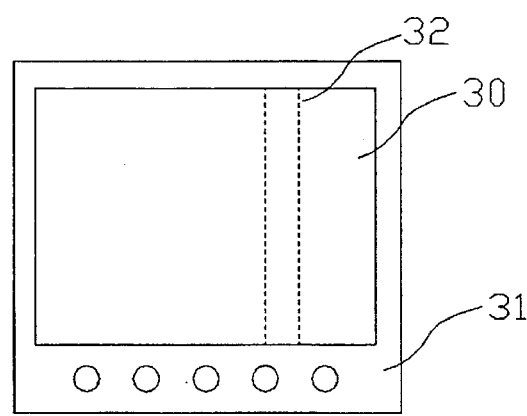
FIG. 6 is a simplified representation of the effect of a scrambled signal on the image presented on a video monitor, wherein the phase of the scrambling sine wave signal has been changed from that represented in FIG. 5.

FIG. 6 is a simplified graphical representation of video image 30 of video receiver 31 wherein the vertical bar has been shifted to the right as a result of a shift in the phase of scrambling signal 15 with respect to video signal 10. Of course, such shifting in the phase of the scrambling signal can result in vertical bar 32 being shifted to the fight or to the left. If the phase of the scrambling signal is changed randomly, every field, instead of remaining fixed, it will be difficult to defeat the scrambling system because the use of a fixed-phase sine-wave in furtherance of piracy will not fully cancel out the scrambling signal, which varies in phase relationship from field to field. More specifically, if the scrambling signal is sought to be counteracted by a fixed-phase descrambling signal, there will always be present a sinusoidal component distorting the video signal, and consequently, there will still be a black sync line somewhere in the video image.

Figure 7:
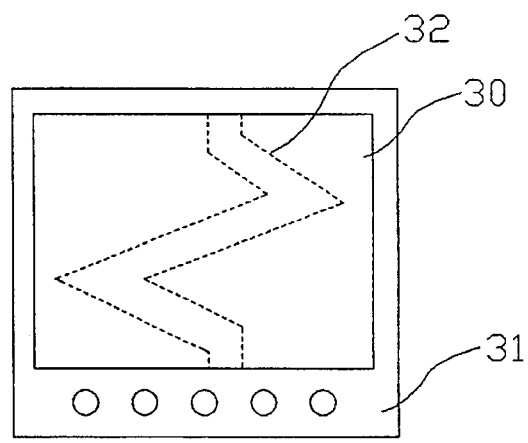
FIG. 7 is a simplified representation of a video image which illustrates the effect of a scrambling sine wave signal which dynamically is changed in phase by a few degrees for each line during the field.

FIG. 7 is a simplified graphical representation of a video image 30 which results when a more elaborate embodiment of the system of the present invention is implemented to create a scrambling sine wave signal which changes phase by a few degrees each line during the field, until a phase-change of approximately 45° is reached. At that point, the phase-change per line is reversed in direction until a phase-change of 45° on the other side is reached. Another reversal in the direction of the phase-change can be introduced at that point, making the scrambling signal change its phase from side to side each time it reaches the 45° point. It may not be desirable to exceed approximately 45° of relative phase shift, as there exists the possibility, depending upon the relative amplitude of the scrambling signal with respect to the negative height of the sync pulse, that synchronization will be effected at the sync pulse.

Figure 8:
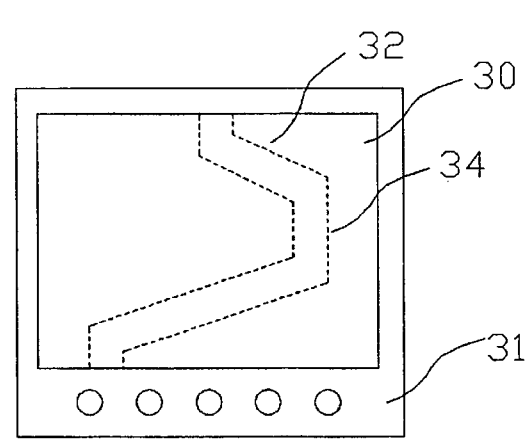
FIG. 8 is a simplified illustration of the image on a video monitor wherein the phase-change is paused for several lines.

FIG. 8 is a graphical representation of video image 30 wherein the phase of the scrambling signal is changed from line to line as in the embodiment of FIG. 7. However, instead of proceeding to a phase shift of 45° and immediately reversing same, as in the embodiment of FIG. 7, the embodiment of FIG. 8 introduces a pause in the sequencing of the phase shift, whereby the same degree of phase shift persists over several lines. This is indicated in the figure by vertical region 34 of bar 32 in FIG. 8. The vertical portion 34 of bar 32 represents a time, or sequence of video lines, during which there is no change in phase in the scrambling signal.

Several predetermined laws of scrambling, such as those depicted in FIGS. 5–8, can be implemented in a scrambling system which operates in accordance with the invention, each such law of scrambling being obtained by varying the number of degrees of phase-change for each horizontal line of the raster. The maximum number of degrees where the reversal of the direction of change of phase occurs is not limited to the 45° noted above, and can include varying lengths of pauses in the phase-change at any one or several points, as well as the value of the scrambling signal at the start of the field. The predetermined modes of phase changes can be stored in the microcontrollers (not shown in these figures) at the encoder and decoder. The encoder (not shown in these figures) would select one of the modes at random and it will inform the decoder (not shown in this figure) in a coded manner, which of the modes is to be used in the following fields. One manner of encoding the scrambling code into the scrambled signal is described in U.S. Pat. No. 5,204,900, which issued to the same inventor as herein.

FIG. 4 is a schematic function block representation of a specific illustrative embodiment of the invention. As shown in this figure, a scrambler/descrambler system 40 has, in this specific embodiment, a sine wave signal generator 41 which produces in its output 42 a sinusoidal scrambling signal, similar to that shown in FIG. 2. FIG. 4 additionally shows output 42 coupled to a plurality of phase-change circuits 50–57. As shown, the inputs of the phase-changing circuits are coupled together such that each of the phase-change circuits, in this embodiment receives the scrambling signal from sine wave signal generator 41. Each of the phase-changing circuits has a respectively associated phase-change characteristic corresponding to a predetermined number of degrees of phase-change. Thus, for example, phase-change circuit 50 will produce at its output the sinusoidal waveform generated by sine wave signal generator 41, but shifted in phase by 10°. In this specific embodiment, each phase-change circuit produces at its output a version of a sinusoidal waveform generated by sine wave signal generator 41, each shifting the phase by a 10° difference from its neighboring phase-change circuit, until a maximum of 80° by phase-change circuit 57.

Each of gates 60–67 has open and closed switching states which are controlled by phase control system 70. In this embodiment, the phase controller is itself controlled by a microcontroller 71. As noted herein, microcontroller 71 may contain a random number generator (not shown) which generates a value which determines the particular distortion mode. Such a value corresponds to a respective one of the plurality of predetermined phased angle variations at the outputs of phase-changing circuits 50–57, which will be combined with the video signal to achieve the scrambling effect. To achieve this end, microcontroller 71 issues an appropriate command to phase controller 70, which causes the appropriate one of gates 60–67 to open. The selected scrambling signal, which corresponds to the selected phased-related distortion mode, is combined with the video signal desired to be scrambled in an adder 72.

If the video signal which is conducted to adder 72 is already scrambled and it is desired to unscramble same, the process of unscrambling can be explained in the context of the scrambler/descrambler system of FIG. 4. More specifically, microcontroller 71, as will be described hereinbelow, has provided a way of a code which identifies the particular phase-related distortion mode which has been used to scramble the scrambled video signal. The microcontroller causes phase controller 70 to open the appropriate one of gates 60–67 so as to provide to adder 72 an inverted form of the signal generator by sine wave signal generator 41. Inversion is achieved by an invertor 74. In this manner, the inverted form of the scrambling signal constitutes a descrambling signal, which, when combined with the scrambled video, cancels out the offending scrambling sine wave signal.

It is to be noted, that in the scrambling arrangement of the present invention, two scrambling characteristics are applied to scramble a video signal. The first distortion characteristic corresponds to the waveform of the scrambled signal generator. In the embodiment described hereinabove, generator 41 produces a sine wave signal. However, numerous other signal waveforms may be employed in the practice of the invention, including switching between plural signal waveforms, so as to render video signal piracy more difficult. The second distortion characteristic corresponds to the phase-change of the selective scrambling signal waveform. The combination of randomly selected phases with arbitrarily selected scrambling signal waveforms greatly complicates the matter of unauthorized descrambling.

It is additionally to be noted that the essentially analogue arrangement described with respect to FIG. 4 is but a specific illustrative embodiment of the invention, and is presented herein to facilitate comprehension thereof. Persons of skill in the art can configure a digital implementation without exceeding the scope of the invention. More specifically, it is within the capabilities of persons of ordinary skill in the art to configure a microcontroller arrangement which digitally synthesizes a scrambling waveform and implements the equivalent of phase-changes by using counters, cascading circuits, and other digital delayed techniques.

FIG. 9 is a schematic graphical representation of a video signal 90 which has been encoded with scrambling information. The video signal, in this embodiment, is shown to have a line portion 91, corresponding to line 11 of a video raster (not shown), a line portion 92 corresponding to line 12 of the video raster, and a line portion 93 corresponding to line 13 of the video raster. The line portions are temporally interposed between sync pulses 95–98. In this specific illustrative embodiment of the invention, line portion 91, which corresponds to line 11 of the video raster, contains three information bits, A, B, and C which can assume "0" or "1" values. The three bits therefore can be employed to identify any one of eight potential distortion modes which are being applied to the raster. In other embodiments, additional bits can be employed to identify the overall distortion law being applied to the video signal, which may include variations in the scrambling waveform and its phase as applied to a video line, a raster, or any other predetermined viewing period. The manner in which this information is encoded or decoded is described in the previously-mentioned U.S. Pat. No. 5,204,900, which issued to the inventor herein.

FIG. 10 is a schematic function block representation of an encoder arrangement 100. In this specific embodiment of the invention, a scrambling signal generator, in the form of sine wave signal generator 101, generates a scrambling waveform and conducts same to a phase shifter 104. Phase shifter 104 has the capacity to produce any of a plurality of phase variations of a scrambling waveform from sine wave signal generator 101, as described hereinabove with respect to FIG. 4. The particular phase variation which is issued by phase shifter 104 is responsive to a value provided by a random number generator 102. The random number generator is coupled to both, the phase shifter, and a code inserter 106 which, in this specific embodiment of the invention, inserts a value corresponding to the output of random number generator 102 into line 11 of video signal 90, in the form of information bits A, B, and C as previously described. The video signal to be encoded with the scrambling information is provided to the code inserter at input 103. The phase shifted scrambling signal at the output of phase shifter 104 and the encoded video signal at the output of code inserter 106 are combined in an adder 107 to produce at the output thereof an encoded and scrambled video signal. This signal is then conducted to a transmitter (not shown) at a sending station.

Figure 11:
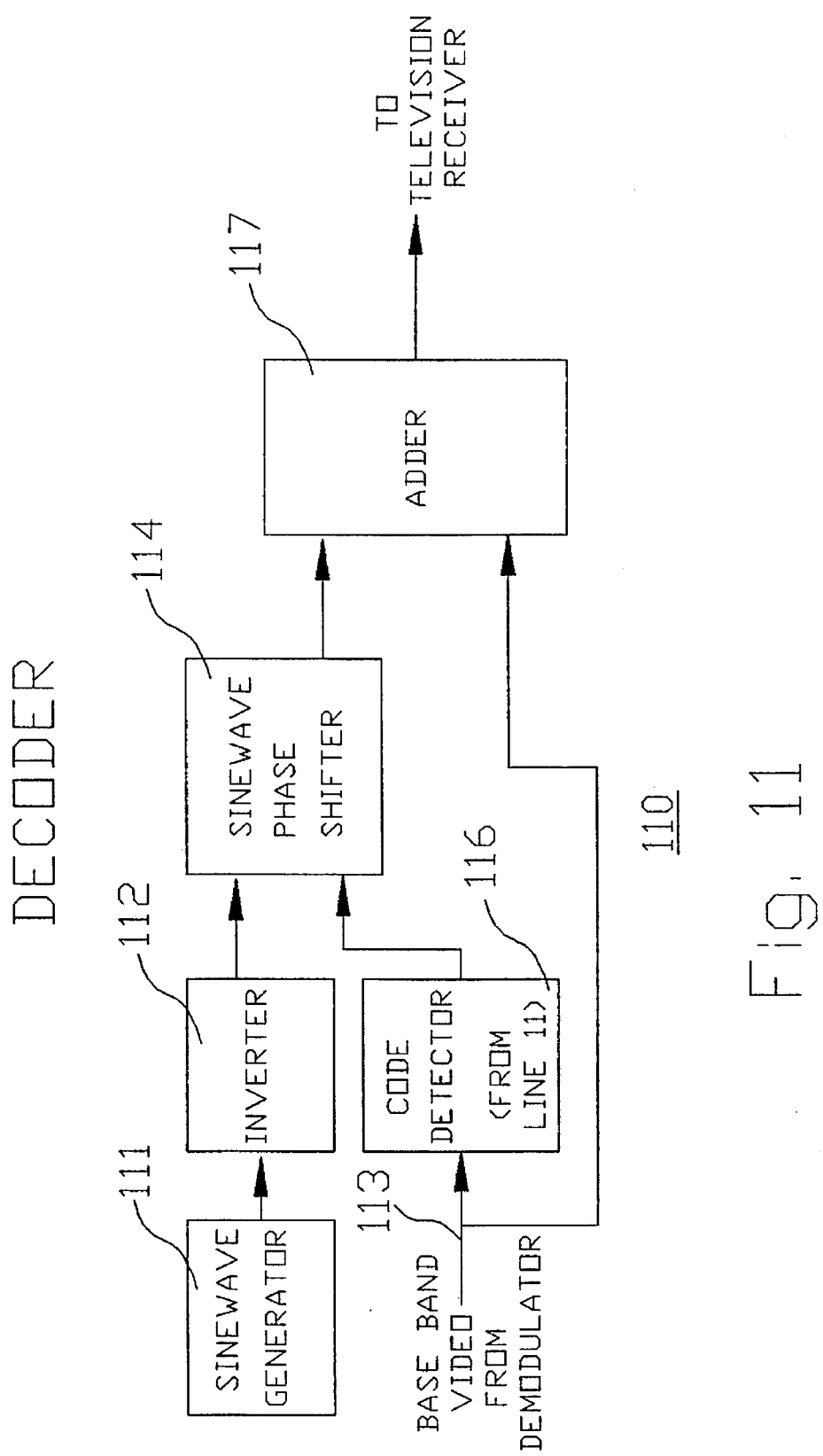
FIG. 11 is a schematic, function block representation of a specific illustrative embodiment of a decoder constructed in accordance with the principles of the invention.

FIG. 11 is a schematic, function block representation of a decoder system constructed in accordance with the principles of the invention and arranged at a receiving station (not shown). As shown, a sine wave signal generator 111 conducts a signal to an inverter 112 so as to produce at the output thereof a descrambling signal. Demodulated base band video is provided at an input 113 of a code detector 116 which identifies the encoding information in line 11 of video signal 90. The encoded scramble information and the inverted scrambling signal are both conducted to a phase shifter 114 which produces at its output a descrambling signal having the appropriate waveform and phase shift characteristics. In this embodiment, therefore, the descrambling signal at the output of phase shifter 114 corresponds to an inversion of the scrambling waveform which was issued at the output of phase shifter 104 in the encoder arrangement of FIG. 10.

The modulated base band video, which is a scrambled video signal, is conducted to an adder 117, along with the descrambling signal from phase shifter 114. The adder effectively cancels out the scrambling signal to provide at an output thereof a descrambled video signal which is conducted to a conventional television receiver (not specifically shown) in this figure.

Decoder arrangement 110 complements encoder arrangement 100. The descrambling signal employs both characteristics of the original scrambling signal. More specifically, the descrambling signal employs the waveform of the scrambling signal, albeit, in an inverted form, and the corresponding phase shift.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for supplying video information contained in a video signal from a sending station exclusively to a receiving station authorized to receive the video information, the system comprising:

a scrambling system, coupled at an input thereof to the sending station for receiving the video signal, for distorting at least a portion of the video signal to produce a distorted video signal which is distorted in accordance with a selected one of a plurality of distortion modes, each distortion mode corresponding to a respective one of a plurality of predetermined angular phase variations of a predetermined video distortion characteristic to produce a corresponding distortion in said distorted video signal;

security code encoder means coupled to said scrambling system for encoding in a portion of the video signal security data which identifies said selected one of said plurality of distortion modes being applied to the video signal to produce said distorted video signal;

security code decoder means coupled to the receiving station for decoding said video signal security data; and a descrambling system, coupled to the receiving station for receiving the distorted video signal and to said security code decoder means, for restoring the video signal in response to said video signal security data received from said security code decoder means, whereby said selected one of said plurality of distortion modes is reversed to produce a corresponding correction in said distorted video signal.

2. The system of claim 1, wherein said descrambling system comprises descrambling combiner means for combining an inverted predetermined angular phase variation of said predetermined video distortion characteristic with said distorted video signal.

3. The system of claim 2, wherein said descrambling combiner means comprises adder means for producing an output video signal corresponding to the sum of said distorted video signal and said inverted predetermined angular phase variation of said predetermined video distortion characteristic.

4. The system of claim 1, wherein said scrambling system comprises scrambling signal generator means for generating said predetermined video distortion characteristic in the form of a distortion characteristic signal.

5. The system of claim 4, wherein said descrambling system comprises descrambling signal generator means for generating an inverted form of said predetermined video distortion characteristic, in the form of a distortion characteristic correction signal.

6. The system of claim 5, wherein said distortion characteristic signal is a substantially periodic signal, having a predeterminable frequency characteristic with respect to a repetition rate of the video signal, and said distortion characteristic correction signal is an inverted form of said substantially periodic signal.

7. The system of claim 1, wherein there is further provided random generator means coupled to said scrambling system for selecting said one of said plurality of distortion modes.

8. The system of claim 1, wherein said security encoder means is arranged to encode said video signal with said security data in an undistorted portion of said video signal.

9. A decoder system for receiving and descrambling a scrambled video signal, the decoder system comprising:

signal generator means for generating a plurality of distortion mode correction signals, each distortion mode correction signal corresponding to a respective one of a plurality of predetermined angular phase variations of a predetermined video distortion characteristic of the scrambled video signal to produce a corresponding correction in the scrambled video signal;

code detector means for providing a scramble code representing said respective one of a plurality of predetermined angular phase variations of said predetermined video distortion characteristic of the scrambled video signal; and signal combining means for combining the scrambled video signal with a respective one of said distortion mode correction signals selected in response to said code detector means.

10. The decoder system of claim 9, Wherein said code detector means is arranged to extract from the scrambled video signal said scramble code representing said respective one of said plurality of predetermined angular phase variations of said predetermined video distortion characteristic of the scrambled video signal.

11. The decoder system of claim 10, wherein said code detector means is arranged to extract said scramble code from an unscrambled portion of the scrambled video signal.

12. The decoder system of claim 9, wherein said distortion mode correction signals each correspond to an inversion of an associated one of said plurality of predetermined angular phase variations of said predetermined video distortion characteristic of the scrambled video signal.

13. The decoder system of claim 9, wherein said signal combiner means comprises an adder arrangement.

14. The decoder system of claim 9, wherein said signal generator means comprises:

correction waveform generator means for generating a video distortion correction characteristic signal which corresponds to an inversion of said predetermined video distortion characteristic of the scrambled video signal;

a plurality of phase-changing circuits, each coupled at an input thereof to said correction waveform generator means and having a respective phase change characteristic, each of said phase-changing circuits having an output for producing a respective predetermined angular phase variation of said video distortion correction characteristic signal;

a plurality of gate means, each having open and closed states and being coupled to a respectively associated one of said phase-changing circuits; and phase control means coupled to each of said gate means for controlling said open and closed states thereof in response to said code detector means.

15. The decoder system of claim 14, wherein there is further provided means for coupling each of said gate means to said signal combining means.

16. An encoder system for receiving a video signal and forming a scrambled video signal, the encoder system comprising:

scrambling signal generator means for generating a plurality of distortion mode signals, each distortion mode signal corresponding to a respective one of a plurality of predetermined angular phase variations of a predetermined video distortion characteristic of the scrambled video signal;

code generator means for providing a scramble code which identifies said respective one of a plurality of predetermined angular phase variations of said predetermined video distortion characteristic of the scrambled video signal; and signal combining means for combining the video signal with said respective one of said distortion mode signals identified by said code generator means.

17. The encoder system of claim 16, wherein there is further provided code inserter means for inserting said scramble code into the scrambled video signal.

18. The encoder system of claim 17, wherein said scramble code is inserted into an unscrambled portion of the scrambled video signal.

19. The encoder system of claim 16, wherein said scrambling signal generator means comprises:

scrambling waveform generator means for generating a video distortion characteristic signal which corresponds to said predetermined video distortion characteristic of the scrambled video signal;

a plurality of phase-changing circuits, each coupled at an input thereof to said scrambling waveform generator means and having a respective phase change characteristic, each of said phase-changing circuits having an output for producing a respective predetermined angular phase variation of said video distortion characteristic signal;

a plurality of scrambling gate means, each having open and closed states and being coupled to a respectively associated one of said phase-changing circuits; and phase control means coupled to each of said scrambling gate means for controlling said open and closed states thereof in response to said code generator means.

20. The encoder system of claim 19, wherein said code generator means comprises a random number generator coupled to said phase control means for selecting a random sequence of said respective phase change characteristics.

21. A method of unscrambling a scrambled video signal received at a receiving station, the scrambled video signal having a plurality of potential scramble modes, the method comprising the steps of:

detecting a scramble code which identifies a phase-related scramble mode of the scrambled video signal;

generating a plurality of possible phase-related correction signals, each having the capacity to correct for a respectively associated one of the plurality of potential scramble modes of the scrambled video signal;

selecting one of said plurality of possible phase-related correction signals in response to said scramble code; and combining the scrambled video signal with said selected one of said plurality of possible phase-related correction signals, whereby the scrambled video signal is unscrambled.

22. The method of claim 21, wherein said step of detecting is performed on the scrambled video signal.

23. The method of claim 22, wherein said step of detecting is performed on an unscrambed portion of the scrambled video signal.

24. The method of claim 21, wherein said step of generating comprises the steps of:

generating a correction signal waveform corresponding to a primary distortion characteristic of the scrambled video signal; and producing a plurality of predetermined phase-shifted versions of the correction signal waveform.

25. The method of claim 24, wherein said primary distortion characteristic of the scrambled video signal comprises a substantially periodic waveform.

26. A method of unscrambling a scrambled video signal received at a receiving station, the scrambled video signal having a plurality of potential scramble modes and being of the type having a plurality of sequential horizontal intervals, the method comprising the steps of:

determining a first scramble characteristic of the scrambled video signal, said first scramble characteristic corresponding to a predetermined time displacement relationship between the sequential horizontal intervals;

detecting a second scramble characteristic of the scrambled video signal, said second scramble characteristic corresponding to a timing phase relationship between said first scramble characteristic of the scrambled video signal and a predetermined one of the sequential horizontal intervals;

determining in response to said step of detecting a one of a plurality of predetermined timing phase relationships between said first scramble characteristic of the scrambled video signal and a predetermined one of the sequential horizontal intervals that has been applied to the scrambled video signal;

generating a correction signal responsive to the one of the plurality of predetermined phase relationships identified in said step of determining which has been applied to the scrambled video signal for correcting for a distortion effect in the scrambled video signal, said correction signal having a first unscramble characteristic corresponding to an inversion of said first scramble characteristic, and a second unscramble characteristic corresponding to the one of said plurality of timing phase relationships identified in said step of determining; and combining the scrambled video signal with said correction signal, whereby the scrambled video signal is unscrambled.

27. The method of claim 26, wherein said first scramble characteristic corresponds substantially to a periodic function having a predeterminable frequency relationship with respect to a selected characteristic of the video signal.

28. The method of claim 27, wherein said periodic function corresponds substantially to a sinusoidal waveform function.

29. The method of claim 27, wherein said periodic function corresponds substantially to a trapezoidal waveform function.

30. The method of claim 26, wherein said step of generating comprises the further step of detecting a scramble code which identifies said predetermined one of a plurality of timing phase relationships between said first scramble characteristic of the scrambled video signal and said predetermined sequential horizontal interval.

31. The method of claim 30, wherein said step of detecting is performed on the scrambled video signal.

32. The method of claim 30, wherein said step of detecting is performed on an unscrambled portion of the scrambled video signal.

* * * * *